US008868470B2

(12) United States Patent (10) Patent No.: US 8,868,470 B2
Xu et al. (45) Date of Patent: Oct. 21, 2014

(54) PARALLEL PROCESSING OF DATA SETS

(75) Inventors: Ning-Yi Xu, Beijing (CN); Feng-Hsiung Hsu, Cupertino, CA (US); Feng Yan, West Lafayette, IN (US)

(73) Assignee: Microsoft Corporation, Redmond, WA (US)

( * ) Notice: Subject to any disclaimer, the term of this patent is extended or adjusted under 35 U.S.C. 154(b) by 647 days.

(21) Appl. No.: 12/942,736

(22) Filed: Nov. 9, 2010

(65) Prior Publication Data
US 2012/0117008 A1 May 10, 2012

(51) Int. Cl.
G06F 1/00 (2006.01)
G06N 5/00 (2006.01)
G06F 9/50 (2006.01)

(52) U.S. Cl.
CPC .................................. *G06F 9/5061* (2013.01)
USPC .............................. 706/12; 704/201; 718/102

(58) Field of Classification Search
USPC ............................................................ 706/12
See application file for complete search history.

(56) References Cited

U.S. PATENT DOCUMENTS

| | | |
|---|---|---|
| 2008/0189232 A1 | 8/2008 | Dunning et al. |
| 2009/0254884 A1 | 10/2009 | Rama et al. |
| 2010/0223605 A1* | 9/2010 | Dai et al. ...................... 717/151 |
| 2010/0241827 A1* | 9/2010 | Yu et al. ......................... 712/30 |
| 2012/0095952 A1* | 4/2012 | Archambeau et al. .......... 706/52 |

OTHER PUBLICATIONS

Asuncion, et al., "Asynchronous Distributed Learning of Topic Models", retrieved on Sep. 3, 2010 at <<http://www.datalab.uci.edu/papers/async_nips08.pdf>>, Advances in Neural Information Processing Systems (NIPS), 2009, pp. 1-9.
Asuncion, et al., "On Smoothing and Inference for Topic Models", retrieved on Sep. 3, 2010 at <<http://www.gatsby.ucl.ac.uk/~ywteh/research/inference/AsuWelSmy2009a.pdf>>, AUAI Press, Proceedings of Conference on Uncertainty in Artificial Intelligence, Montreal, Canada, 2009, pp. 27-34.
Blei et al., "Latent Dirichlet Allocation," Journal of Machine Learning Research, vol. 3, Jan. 2003, pp. 993-1022.
Boyd, et al., "Convex Optimization", retrieved on Sep. 3, 2010 at <<http://www.stanford.edu/~boyd/cvxbook/bv_cvxbook.pdf>>, Cambridge University Press, 2004, pp. 1-730.

(Continued)

*Primary Examiner* — Jeffrey A Gaffin
*Assistant Examiner* — Kalpana Bharadwaj
(74) *Attorney, Agent, or Firm* — Carole Boelitz; Micky Minhas; Lee & Hayes PLLC (57) ABSTRACT

Systems, methods, and devices are described for implementing learning algorithms on data sets. A data set may be partitioned into a plurality of data partitions that may be distributed to two or more processors, such as a graphics processing unit. The data partitions may be processed in parallel by each of the processors to determine local counts associated with the data partitions. The local counts may then be aggregated to form a global count that reflects the local counts for the data set. The partitioning may be performed by a data partition algorithm and the processing and the aggregating may be performed by a parallel collapsed Gibbs sampling (CGS) algorithm and/or a parallel collapsed variational Bayesian (CVB) algorithm. In addition, the CGS and/or the CVB algorithms may be associated with the data partition algorithm and may be parallelized to train a latent Dirichlet allocation model.

20 Claims, 6 Drawing Sheets

ENVIRONMENT 100

(56) References Cited

OTHER PUBLICATIONS

Griffiths, et al., "Finding scientific topics", retrieved on Sep. 3, 2010 at <<http://psiexp.ss.uci.edu/research/papers/sciencetopics.pdf>>, Proceedings of the National Academy of Sciences (PNAS), vol. 101, Supplement 1, 2004, pp. 5228-5235.

Kyrola, "10-702 Project Report: Parallel LDA, Truth or Dare?", retrieved on Sep. 3, 2010 at <<http://www.cs.cmu.edu/~akyrola/10702project/kyrola10702FINAL.pdf>>, Carnegie Mellon University, retrieved 2010, pp. 1-12.

Labonte, et al., "The Stream Virtual Machine", retrieved on Sep. 3, 2010 at <<http://ieeexplore.ieee.org/stamp/stamp.jsp?tp=&arnumber=1342560>>, IEEE Computer Society, Proceedings of International Conference on Parallel Architecture and Compilation Techniques (PACT), 2004, pp. 267-277.

Lumian, "gpulda—Fast Training for Latent Dirichlet Allocation on Graphics Processors", retrieved on Sep. 6, 2010 at <<http://code.google.com/p/gpulda/>>, Google Inc., 2010, pp. 1.

Masada, et al., "Accelerating collapsed variational bayesian inference for latent dirichlet allocation with nvidia CUDA compatible devices", retrieved on Sep. 3, 2010 at <<http://naosite.lb.nagasaki-u.ac.jp/dspace/bitstream/10069/22536/1/LNCS5579_491.pdf>>, Springer Berlin, Lecture Notes in Computer Science vol. 5579, 2009, pp. 491-500.

Nallapati, et al., "Parallelized Variational EM for Latent Dirichlet Allocation: An Experimental Evaluation of Speed and Scalability", retrieved on Sep. 3, 2010 at <<http://www.cs.cmu.edu/~wcohen/postscript/icdm-workshop-2007-parallel.pdf>>, IEEE Computer Society, Proceedings of International Conference on Data Mining Workshops (ICDMW), 2007, pp. 349-354.

Newman, et al., "Distributed Inference for Latent Dirichlet Allocation", retrieved on Sep. 3, 2010 at <<http://citeseerx.ist.psu.edu/viewdoc/download?doi=10.1.1.68.6755&rep=rep1&type=pdf>>, MIT Press, Neural Information Processing Systems (NIPS), 2008, pp. 1081-1088.

Petterson, et al., "Scalable Inference for Latent Dirichlet Allocation", retrieved on Sep. 3, 2010 at <<http://arxiv.org/PS_cache/arxiv/pdf/0909/0909.4603v1.pdf>>, ARXIV, Sep. 25 2009, pp. 1-14.

Pletscher, Slides from Seminar talk on "Latent Dirichlet Allocation," by Blei et al., retrieved on Sep. 20, 2010 at <<http://www.pletscher.org/academics/undergraduate/talks/>>, Dec. 13, 2005, 34 pages.

Porteous, et al., "Fast Collapsed Gibbs Sampling for Latent Dirichlet Allocation", retrieved on Sep. 3, 2010 at <<http://www.ics.uci.edu/~asuncion/pubs/KDD_08.pdf>>, ACM, Proceeding of International Conference on Knowledge Discovery and Data Mining (KDD), Las Vegas, Nevada, Aug. 2008, pp. 569-577.

Suchard, et al., "Understanding GPU Programming for Statistical Computation: Studies in Massively Parallel Massive Mixtures", retrieved on Sep. 3, 2010 at <<http://ftp.stat.duke.edu/WorkingPapers/10-02.pdf>>, Journal of Computational and Graphical Statistics, 2010, pp. 1-24.

Teh, et al., "A Collapsed Variational Bayesian Inference Algorithm for Latent Dirichlet Allocation", retrieved on Sep. 3, 2010 at <<http://www.gatsby.ucl.ac.uk/~ywteh/research/inference/nips2006.pdf>>, MIT Press, Advances in Neural Information Processing Systems (NIPS), 2006, pp. 1353-1360.

* cited by examiner

PARALLEL PROCESSING OF DATA SETS

BACKGROUND

Processing and learning from large data sets, such as documents, text, images, and/or other scientific data, for example, have applications in various scientific and engineering disciplines. The scale of these data sets, however, often demand high, and sometimes prohibitive, computational cost. Therefore, multiple processors may be used to employ learning methods on such large data sets. While large clusters of central processing units (CPUs) are commonly used for processing large data sets, graphics processing units (GPUs) provide an alternate, and often more powerful, platform for developing machine learning methods. However, for large corpora, it still may take days, or even months, for one or more GPUs to train a particular model.

SUMMARY

Described herein are techniques for partitioning data sets and parallelizing processors and/or algorithms to train a learning model. In one embodiment, a method includes partitioning a data set into a plurality of data partitions and distributing each of the data partitions across a plurality of processors. The method may also include processing, by the processors, each of the data partitions in parallel and synchronizing the plurality of processors to obtain a global record corresponding to the processed data partitions. In the above embodiment, the partitioning may be performed by a data partition algorithm. Moreover, the above method may parallelize one or more algorithms, such as a collapsed Gibbs sampling (CGS) algorithm or a collapsed variational Bayesian (CVB) algorithm, for training a learning method, such as latent Dirichlet allocation (LDA).

In other embodiments, described herein are techniques and/or methods for distributing a plurality of documents partitioned from a data set across a plurality of processors. The methods and/or techniques may further include processing, by each of the processors and in parallel with the other processors, a subset of the plurality of documents to determine local counts and/or expected local counts of the subset of documents. In various embodiments, the local counts and/or the expected local counts may correspond to topics or words associated with the plurality of documents. Subsequently, the local counts may be aggregated from each of the processors to generate a global count. Alternatively, variational parameters associated with the expected local counts may be determined by a computing device and/or by processors of the computing device. The foregoing embodiments may be performed utilizing the CGS algorithm or the CVB algorithm mentioned above.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Described herein are systems and/or techniques for implementing one or more learning algorithms on one or more data sets. More particularly, embodiments described herein include systems and/or techniques for parallelizing inference algorithms, such as a collapsed Gibbs sampling (CGS) algorithm or a collapsed variational Bayesian (CVB) algorithm, for latent Dirichlet allocation (LDA) training on one or more processors, such as a graphics processing unit (GPU).

For the purposes of this discussion, an algorithm may be defined as an effective method of solving a problem expressed as a finite sequence of instructions. Likewise, an algorithm may relate to a list of well-defined instructions for completing a task. In addition, machine learning or learning methods relate to the design and development of algorithms that allow computers to evolve behaviors on empirical data, such as data from sensors or databases. That is, machine learning may include automatically learning to recognize patterns and making intelligent decisions based on the patterns.

As stated above, implementing machine learning methods with respect to large data sets may incur significant computational cost in terms of time, expense, and/or resources. Such learning methods may be performed in parallel among multiple processors (parallelized), including a graphics processing unit (GPU), which may provide a platform for developing parallel machine learning methods. In various embodiments, a GPU may be a specialized microprocessor that accelerates three-dimensional or two-dimensional graphics and general data processing from another microprocessor, such as a central processing unit (CPU). In addition, a GPU may possess built-in parallel thread processors and high-speed memory, which allow a GPU to be more cost effective, energy-efficient, and/or powerful than its CPU counterpart. Therefore, learning methods may be developed more efficiently utilizing a GPU.

In one embodiment, the techniques and systems described herein are directed to developing parallel approaches for training a latent Dirichlet allocation (LDA) model on one or more GPUs. An LDA model may refer to a generative model that allows sets of observations to be explained by unobserved groups which explain why some parts of a data set are similar. For large data sets, however, it may take a significant amount of time to train the LDA model. In order to reduce the time required to train such a model, and to limit the associated computational cost, various embodiments described herein utilize the parallel computing power of GPUs and analyze the algorithmic structures of LDA learning methods.

In particular, the embodiments described herein introduce a parallel CGS algorithm and a parallel CVB algorithm on shared memory platforms, such as a GPU, for training the LDA model. The CGS algorithm and the CVB algorithm will be described in additional detail with respect to FIG. 1. In addition, various embodiments further describe a data partition algorithm that avoids memory access conflicts on GPUs and efficiently balances workloads across multiple processors.

Various examples of partitioning and processing techniques associated with large data sets, in accordance with the embodiments, are described below with reference to FIGS. 1-6.

Figure 1:
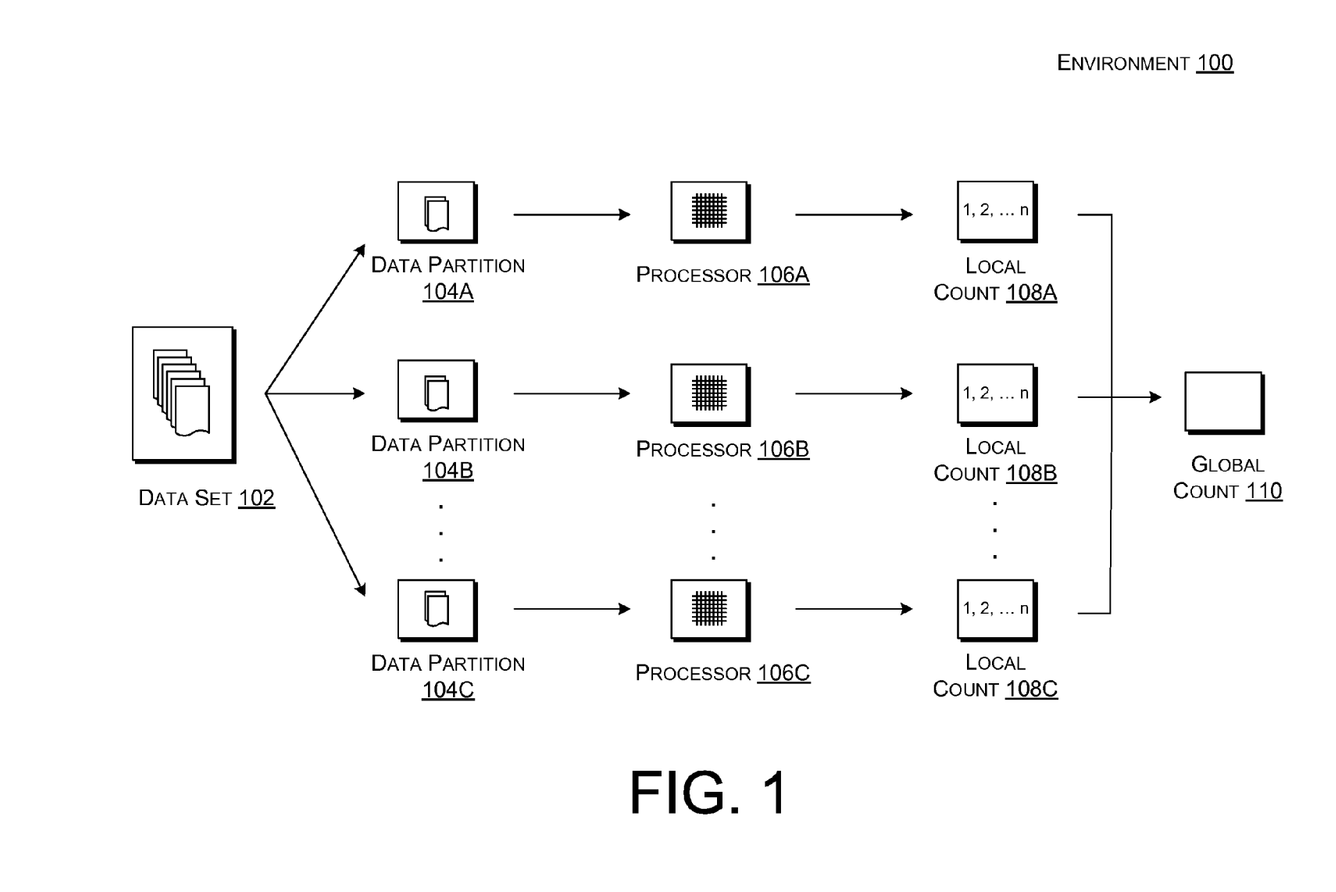
FIG. 1 illustrates a diagram showing an environment for parallelizing data to perform partitioning and processing of the data, in accordance with various embodiments.

FIG. 1 illustrates a diagram representing an environment 100 for the partitioning and the processing of a data set using one or more processors. As shown, FIG. 1 includes a data set 102, data partitions 104A-104C, processors 106A-106C, local count 108A-108C, and global count 110. In one embodiment, the data set 102 may include any type of data or information, such as, for example, documents, text, and/or images. As stated above, it may take a significant amount of time (days, months, etc.) to process the data set and, therefore, to train a particular model. Accordingly, the data set 102 may be partitioned into one or more data partitions 104A, 104B, and 104C. Although FIG. 1 illustrates three different data partitions 104A-104C, it is contemplated that the data set 102 may be partitioned into more or less data partitions.

In an example embodiment, each piece of data included in the data set 102 may be dependent on other pieces of data within the data set 102. Therefore, in order to process the data set 102 as a whole, each piece of data would likely need to be sequentially processed. For instance, assume that the data set 102 includes three pieces of data (A, B, and C), in which data B is dependent upon data A and data C is dependent upon data B. Because data B and data C are either directly or indirectly dependent upon data A, it logically follows that data A would need to be processed before processing data B and data C. Likewise, data C could not be processed until data B was first processed. In other words, due to the above dependencies, data A, B, and C would need to be processed sequentially, one after another, as opposed to being processed at the same time in parallel. Processing the data within the data set 102 in a sequential order may take significant more time than processing pieces of data within the data set 102 in parallel.

As mentioned previously, the data set 102 may be partitioned into data partitions 104A, 104B, and 104C. Partitioning the data set 102 into smaller pieces of data may remove some or all the dependencies described above. For instance, with respect to the example described in the preceding paragraph, assume that the data set 102 includes data A, data B, and data C. Moreover, further assume that data A, data B, and data C each include subparts $a_1$-$a_3$, $b_1$-$b_3$, and $c_1$-$c_3$, respectively. In this example, subparts $a_1$, $b_1$, and $c_1$ may be distributed to processor 106A, subparts $a_2$, $b_2$, and $c_2$ may be distributed to processor 106B, and subparts $a_3$, $b_3$, can $c_3$ may be distributed to processor 106C in parallel. Each of the subparts may also be distributed to the processors 106A-106C sequentially. That is, subparts $a_1$-$a_3$ may first be distributed to the processors 106A-106C and, once processed, the next subparts $b_1$-$b_3$ to be processed may be distributed to the processors 106A-106C, and so on.

Following distribution of the subparts, regardless of whether the subparts are distributed in parallel or sequentially, the processors 106A-106C may then process the subparts associated with data A (subparts $a_1$-$a_3$). Once these subparts $a_1$-$a_3$ are processed, the processors 106A-106C may then process the subparts associated with data B (subparts $b_1$-$b_3$), and then process the subparts associated with data C (subparts $c_1$-$c_3$). However, the subparts may be distributed to the processors in other groupings that accommodate parallel processing. Therefore, the environment 102 allows for the processors 106A-106C to simultaneously process the subparts associated with a particular piece of data. Because the data is distributed across the processors 106A-106C, as opposed to being distributed to one particular processor 106A-106C, the processors 106A-106C may process the data more quickly and more efficiently. Otherwise, assuming that data A should be processed first, one processor 106A would first need to process subparts $a_1$-$a_3$. Processor 106B would be unable to process subparts $b_1$-$b_3$ until the first processor 106A was finished. Likewise, processor 106C would be unable to process subparts $c_1$-$c_3$ until processor 106B had finished processing its respective data. Such delays would cause unneeded waste of both time and computational cost.

Consequently, as the data partitions 104A, 104B, and 104C no longer depend upon one another, each of these data partitions 104A-104C may be processed simultaneously. In various embodiments, the data set 102 may be partitioned utilizing a partition algorithm, which will be discussed in additional detail in FIG. 2. After partitioning the data set 102, the data partitions 104A-C may each be distributed across the plurality of the processors 106A-106C. In this embodiment, data partition 104A is distributed to processor 106A, data partition 104B is distributed to processor 106B, and data partition 104C is distributed to processor 106C. However, any number of data partitions and/or processors are contemplated herein. Once the data partitions 104A-104C are distributed, each of the processors 106A-106B may store their respective data partitions 104A-104C. Moreover, in additional embodiments, any one or more of the processors 106A-106C may be implemented as GPUs.

In the above embodiment, each of the processors 106A-106C may subsequently process the data partition 104A-104C that was distributed to that processor. For example, and as stated above, the data (data A, data B, and data C) may be distributed to the processors 106A-106B so that one processor 106A processes subparts $a_1$, $b_1$, and $c_1$, one processor processes subparts $a_2$, $b_2$, and $c_2$, and the other processor 106C processes subparts $a_3$, $b_3$, can $c_3$ in the manner described above. Further, as dependencies between the data partitions 104A-104C were previously removed as a result of the partitioning, the processors 106A-106C may process their respective data partitions 104A-104C in parallel. That is, each processor, such as processor 106B, may process data distributed to it at the same time as the other processors, such as processors 106A and/or 106C, without needing to wait for the other processors to complete their respective processing. Such parallelized processing may significantly decrease the time associated with processing large data sets 102. Moreover, the parallelized processing may be performed by one or more algorithms.

Each of processors 106A-106B may then process their respective data partitions 104A-104C to determine the local count 108A-108C for each of the data partitions 104A-104C. For instance, the processors 106A, 106B, and 106C determine local count 108A, local count 108B, and local count 108C, respectively. The local counts 108A-108C may relate to any type of information associated with the data partitions 104A-104C, such as, for example, words and/or images included in each data partition 104A-104C, topics associated with each data partition 104A-104C, and the like. Moreover, the local counts 108A-108C may also reflect a number of words and/or images included in each data partition 104A-104C and/or a number of topics associated with each data partition 104A-104C. Assuming that the data partitions 104A-104C represent the entire data set 102, a combination of the local counts 108A-108C could reflect an aggregate total of the local counts 108A-108C for the data set 102. This aggregate total may be the same as the global count 110. As mentioned previously, the processors 106A-106C may be parallelized so that the local counts 108A-108C can be determined simultaneously.

After the local counts 108A-108C are determined, the processors 106A-106C may be synchronized, which may cause the local counts 108A-108C to be merged into a global count 110. As stated above, the global count 110 may be an aggregated total of the local counts 108A-108C. Since the global count may reflect an aggregate number of the local counts 108A-108C associated with the data partitions 104A-104C, the global count 110 may reflect the total number of counts associated with data set 102. That is, provided that the local counts 108A-108C correspond to a number of topics associated with each data partition 106A-106C of the data set 102, the global count 110 would then reflect a total number of topics associated with the data set 102. Moreover, the environment 100 may facilitate in determining the global count 110 by using a single copy of various parameters stored in a device memory shared by the plurality of the processors 106A-106C.

As stated above, in one embodiment, assume that the processors 106A-106C sequentially process the data partitions 104A-104C one processor at a time. In this embodiment, a total amount of time to generate the local counts 108A-108C should approximately equal the cumulative amount of time taken by each processor 106A-106C to process the data partitions 104A-104C distributed to each processor 106A-106C. On the contrary, parallelizing the processors 106A-106C should decrease the amount of time needed to generate the local counts 108A-108C since the environment 100 is limited only by a slowest processing (e.g., task completion) by one of the processors 106A-106C. That is, once the slowest processing of one of the processors 106A-106C has completed processing its corresponding data partition 104A-104C, the local counts 108A-108C may be aggregated to form the global count 110. Therefore, utilizing a parallelized method may save considerable time and/or resources.

In one embodiment, the data set 102 may include multiple documents, such as papers, notes, and/or various files, for example. In this embodiment, the data set 102 may be partitioned to form a plurality of subsets of documents that may be distributed across the plurality of the processors 106A-106C. As a result of the partitioning, most or all dependencies that previously existed in the data set 102 may no longer exist. Therefore, each of the subsets of documents may not depend upon any other documents not included in that particular subset of documents. Furthermore, provided that the documents include text, each of the documents may contain a plurality of words. Moreover, each word included therein may be associated with one or more topics.

Upon distribution of the partitioned subset of documents to the plurality of the processors 106A-106C, each processor 106A-106C may process each subset of documents to identify the local counts 108A-108C associated with each distributed subset of documents. As stated above, the processing may be performed in parallel so that each processor 106A-106C may process its respective subset of documents without needing to wait for the other processors 106A-106C to complete their respective processing. In this embodiment, the local counts 108A-108C may correspond to a topic-word assignment or a topic count associated with each subset of documents. In various embodiments, the topic-word assignment may refer to words or phrases associated with topics described in each of the subset of documents. For instance, words or phrases such as "artillery" or "prisoner of war" may be associated with the topic, "military," whereas words like "drama" or "comedy" may be associated with the topic, "television." Furthermore, the topic count may correspond to the number of words, phrases, documents, or other elements associated with the plurality of documents that are associated with a specific topic(s) associated with each subset of documents (i.e., military, television, etc.). Additionally, the topic-word assignments or the topic counts may be determined using a parallel CGS algorithm executed on a GPU, which will be described in further detail below.

Once the local counts 108A-108C are determined by the plurality of the processors 106A-106C, each processor 106A-106C may store a local copy of each corresponding topic-word assignment or topic count. Subsequently, the local counts 108A-108C determined from the subsets of documents may be aggregated to generate the global count 110. In an example embodiment, the global count 110 represents a total number of topic-word assignments or topic counts associated with the plurality of documents included in the data set 102. Therefore, the environment 100 is able to identify one or more topics included in a data set that includes a subset of documents, as well as various words associated with these topics. Having knowledge of the topics associated with the plurality of documents may allow the environment 100 to recommend or identify a particular document based on a topic of interest.

In a different embodiment, the plurality of documents included in the data set 102 may also be partitioned into subsets of documents and distributed to the plurality of processors 106A-106B. As stated above, each processor 106A-106C may process the subset of documents to generate the local count 108A-108C. However, in this embodiment, the local counts 108A-108C are instead expected local counts. The expected local counts correspond to topics or words (which associated with topics) that are expected to be included in each subset of documents. The expected local counts may also be saved, either locally or externally, by each respective processor 106A-106C. Once the expected local counts are identified, the processors 104A-104C may be synchronized. During synchronization, the expected local counts may be merged to form the global count 110. In this embodiment, the global count 110 may correspond to variational parameters that represent a distribution of topics for words included in the plurality of documents. Moreover, the expected local counts and/or the global count 110 may be determined using a parallel CVB algorithm executed by a GPU.

In an example embodiment, the local counts 108A-108C and/or the global count may be used to partition the data set 102 into the data partitions 104A-104C. More particularly, the local counts 108A-108C and/or the global count 110 may be used with the data partition algorithm in order to partition the data set 102.

As stated above, inference algorithms may be parallelized for LDA training on a shared memory platform, such as a GPU. More particularly, a CGS algorithm and/or a CVB algorithm may be utilized to train an LDA model. Utilizing such algorithms in the context of large data sets may significantly reduce computational costs.

In an example embodiment, LDA models each of documents (D) as a mixture over latent topics (K). Each topic (k) may be a multinomial distribution over a word vocabulary having distinct words (W) denoted by $\phi_k=\{\phi_{kw}\}$, where $\phi_k$ is drawn from a symmetric Dirichlet prior with parameter $\beta$. In order to generate a document (j), the document's mixture over topics, $\theta_j=\{\theta_{jk}\}$ is first drawn from a symmetric Dirichlet prior with parameter α. Further, for the ith token in the document, a topic assignment ($z_{ij}$) is drawn with k chosen with probability $\theta_{jk}$. Subsequently, word $x_{ij}$ is drawn from the $z_{ij}$th topic, with $x_{ij}$ taking on value w with probability $\phi_{z_{ij}w}$. In view of the foregoing, the full generative process is shown in Equation 1 as follows:

$$\theta_{jk} \sim D[\alpha], \phi_{kw} \sim D[\beta], z_{ij} \sim \theta_{jk}, x_{ij} \sim \phi_{z_{ij}w}. \quad (1)$$

Given the training data with N words=$\{x_{ij}\}$, the posterior distribution over the latent variables may be computed. In various embodiments, CGS may be used to sample posterior distribution of topic assignment=$\{z_{ij}\}$ by integrating out all $\theta_{jk}$ and $\phi_{kw}$. Moreover, given the current state of all but one variable $z_{ij}$, the conditional distribution of $z_{ij}$ is shown in Equation 2:

$$P(z_{ij} = k \mid z^{-ij}, x, \alpha, \beta) \propto \frac{n_{x_{ij}k}^{-ij} + \beta}{n_k^{-ij} + W\beta}(n_{jk}^{-ij} + \alpha). \quad (2)$$

where $n_{wk}$ denotes the number of tokens with word w assigned to topic k and where $n_{jk}$ denotes the number of tokens in document j assigned to topic k and $$n_k^{-ij} = \Sigma_w n_{wk}^{-ij}.$$

Further, subscript ¬ ij denotes that the variable is calculated as if token ij is removed from the training data.

CGS is an efficient because the variance is greatly reduced by sampling in a collapsed state space. Additionally, the same state space may be applied to variational Bayesian (VB) methods and in the form of the CVB algorithm. CVB has a theoretically tighter variational bound than standard VB. However, in CVB methods, posterior distribution may be approximated by a factorized posterior $q(z)=\Pi_{ij} q(z_{ij}|\gamma_{ij})$, where $q(z_{ij}|\gamma_{ij})$ is a multinomial with variational parameter $\gamma_{ij}=\{\gamma_{ijk}\}$. The inference task is to find variational parameters that maximize the variational lower bound $$L(q) = \sum q(z) \log \frac{p(z, x \mid \alpha, \beta)}{q(z)}.$$

To achieve this, a computationally efficient Gaussian approximation may be utilized in Equations 3 and 4. As shown above, the updating formula for $\gamma_{ij}$ is similar to the CGS updates:

$$\gamma_{ijk} \propto (E_q[n_{x_{ij}k}^{-ij}] + \beta)(E_q[n_{jk}^{-ij}] + \alpha)(E_q[n_k^{-ij}] + W\beta)^{-1}. \quad (3)$$

$$\exp\left(-\frac{\text{Var}_q[n_{x_{ij}k}^{-ij}]}{2(E_q[n_{x_{ij}k}^{-ij}] + \beta)^2} - \frac{\text{Var}_q[n_{jk}^{-ij}]}{2(E_q[n_{jk}^{-ij}] + \alpha)^2} + \frac{\text{Var}_q[n_k^{-ij}]}{2(E_q[n_k^{-ij}] + W\beta)^2}\right). \quad (4)$$

where the expectations and variancees are given by Equation 5:

$$E_q[n_{jk}] = \Sigma_i \gamma_{ijk} \text{Var}_q[n_{jk}] = \Sigma_i \gamma_{ijk}(1-\gamma_{ijk})$$

$$E_q[n_{kw}] = \Sigma_{x_{ij}=w,j} \gamma_{ijk} \text{Var}_q[n_{kw}] = \Sigma_{x_{ij}=w,j} \gamma_{ijk}(1-\gamma_{ijk})$$

$$E_q[n_k] = \Sigma_{i,j} \gamma_{ijk} \text{Var}_q[n_k] = \Sigma_{i,j} \gamma_{ijk}(1-\gamma_{ijk}). \quad (5)$$

Furthermore, LDA training may be parallelized using a parallel CGS sampling algorithm by distributing a plurality of documents across P processors 104A-104C. These documents may first be partitioned from a data set 102. More particularly, D documents and document-specific counts $n_{jk}$ are distributed over P processors 104A-104C, with $$\frac{D}{P}$$

documents on each processor. Thus, because $$\frac{D}{P}$$

documents are distributed to each processor 104A-104C, the overall workload is may be balanced across the processors 104A-104C. In each iteration, each processor 104A-104C (p) 104A-104C independently runs local Gibbs sampling with its own copy of topic-word count or assignment ($n_{kw}^P$) and topic counts ($n_k^P = \Sigma_w n_{kw}^P$) in parallel. Then a global synchronization may aggregate local counts 108A-108C $n_{kw}^P$ to produce the global counts 110 of $n_{kw}$ and $n_k$.

The parallel CGS algorithm described herein may only require a single copy of $n_{kw}$. In contrast, previous systems stored many copies (P copies) of topic-word counts or assignments $n_{kw}$ for all processors 104A-104C, which is often unpractical for GPUs with a large P and large data sets due to the limited amount of available memory in various devices. For example, a data set having 100,000 vocabulary words may need at least 1.4 gigabytes to store 256-topic $n_{wk}$ for 60 processors, which may exceed the device memory capacity of current high-end GPUs.

In one embodiment associated with the parallel CGS algorithm, assume, for word token $w_1$ in document $j_1$ and word token $w_2$ in document $j_2$, that $w_1 \neq w_2$ and $j_1 \neq j_2$. In view of the foregoing, simultaneous updating of topic assignments will not have any memory read/write conflicts on document-topic counts $n_{jk}$ and topic-word counts or assignments $n_{wk}$. Moreover, in addition to dividing all documents $J=\{1, \ldots, D\}$ to P (disjoint) sets of documents $J_1, \ldots, J_p$, and distributing the sets of documents to P processors 106A-106C, the vocabulary words $V=\{1, \ldots, W\}$ are further divided into into P disjoint subsets $V_1, \ldots, V_p$. Further, each processor p (p=0, \ldots, P-1) 106A-106C may store a local copy of topic counts $n_k^P$. Each parallel CGS training iteration consists of P epochs and each epoch may consist of a sampling step and a synchronization step. In the sampling step of the lth epoch (l=0, \ldots, P-1), processor p 106A-106C samples topic assignments $l_{ij}$, whose document index is $j \in J_p$ and whose word index is $x_{ij} \in V_{p \oplus l}$. The ⊕ is the modulus P addition operation defined by Equation 6:

$$a \oplus b = (a+b) \mod P. \quad (6)$$

The processors 106A-106C run the sampling simultaneously without memory read/write conflicts on the global counts 110 $n_{jk}$ and $n_{wk}$. Subsequently, the synchronization step uses the following to aggregate $n_k^P$ to global counts $n_k$, which is used as local counts 108A-108C in the next epoch, as illustrated in Equation 7.

$$n_k \leftarrow n_k + \Sigma_p(n_k^P - n_k), n_k^P \leftarrow n_k. \quad (7)$$

Moreover, the parallel CGS algorithm may use the data partition in local sampling and may insert {P−1} more synchronization steps within an iteration. Since the data partition ensures that any two processors 106A-106C access neither the same document nor the same word in an epoch, the synchronization of $n_{wk}$ is equivalent to keeping $n_{wk}$ unchanged after the sampling step of the epoch.

In an additional embodiment, the CGS and the CVB may be similar in their algorithmic structures. However, despite any similarities, CVB replaces counts $n_{wk}$, $n_{jk}$, and $n_k$ by their respective expectations and topic assignment $z_{ij}$ in CGS are replaced by variational parameters $\gamma_{ij}$, which give a distribution over topics for each word token, as opposed to a unit mass. Moreover, both the CGS and the CVB algorithms run in a sequential manner, namely sampling $z_{ij}$ or updating $\gamma_{ij}$, one by one. Additionally, similar data partition techniques employed by the parallel CGS are used to parallelize CVB. A single iteration of the parallel CVB also consists of P epochs, and each epoch has two steps, an updating step and a synchronization step. The updating step may update variational parameters in a similar manner as the sampling step of parallel CGS. However, the counts in CGS may be replaced by expectations and variances in parallel CVB.

In the above embodiment, the synchronization step involves an affine combination of the variational parameters in the natural parameter space. Since multinomial distribution belongs to the exponential family, the multinomial distribution can be represented over K topics defined by mean parameter $\gamma_{ij}$ in natural parameter $\lambda_{ij} = (\lambda_{ijk})$ by $$\lambda_{ijk} = \log\left(\frac{\gamma_{ijk}}{1 - \sum_{k' \neq K} \gamma_{ijk'}}\right)$$

for k=1, 2, ..., K−1, and the domain of $\lambda_{ij}$ is unconstrained. Thus, maximizing $L(q(\lambda))$ becomes an issue of unconstrained optimization. Moreover, parallel CVB denotes that $\lambda_m = (\lambda_{ij})_{j \in J_m}$, $\lambda = (\lambda_0, \ldots, \lambda_{P-1})$ and $\lambda^{new}$ and $\lambda^{old}$ are to be the variational parameters immediately after and before the updating step, respectively. In addition, assume that $\lambda^{(p)} = (\lambda_0^{old}, \ldots, \lambda_p^{new}, \ldots, \lambda_{P-1}^{old})$. Moreover, $\lambda^{sync}$ is picked as an undated $\lambda$ from a one-parameter class of variational parameters $\lambda(\mu)$ that combines the contribution from all the processors 104A-104C, as shown in Equation 8:

$$(\mu) = {}^{old} + \mu \sum_{i=0}^{P-1} (\lambda^{(i)} - \lambda^{old}), \mu \geq 0. \quad (8)$$

Further, $$\lambda^{sync} = \lambda\left(\frac{1}{P}\right)$$

is a convex combination of $\{\lambda^{(p)}\}$ and $\lambda^{sync} = \lambda(1) = \lambda^{new}$. If a (quasi)concavity holds in sufficient large neighborhoods of the sequence of $\lambda(\mu)$, perhaps near a local maximum having a negatively defined Hessian, then $L(q(\lambda(\mu))) \geq \max_p L(q(\lambda^{(p)})) \geq L(q(\lambda^{old}))$ and $L(q)$ converges locally. For the second case, $\gamma^{new}$ is kept and only $E_q[n_k]$ and $Var_q[n_k]$ are updated in the synchronization step. The formulas are illustrated in Equations 9 and 10:

$$E[n_k] \leftarrow E[n_k] + \Sigma_p(E[n_k^p] - E[n_k]), E[n_k^p] \leftarrow E[n_k]. \quad (9)$$

$$Var[n_k] \leftarrow Var[n_k] + \Sigma_p(Var[n_k^p] - Var[n_k]), Var[n_k^p] \leftarrow Var[n_k]. \quad (10)$$

Also, $\lambda(1)$ may assign a larger step size to the direction $$\sum_{i=0}^{P-1}(\lambda^{(i)} - \lambda^{old}).$$

Therefore, a faster convergence rate may be achieved if it is an ascending direction.

Figure 2:
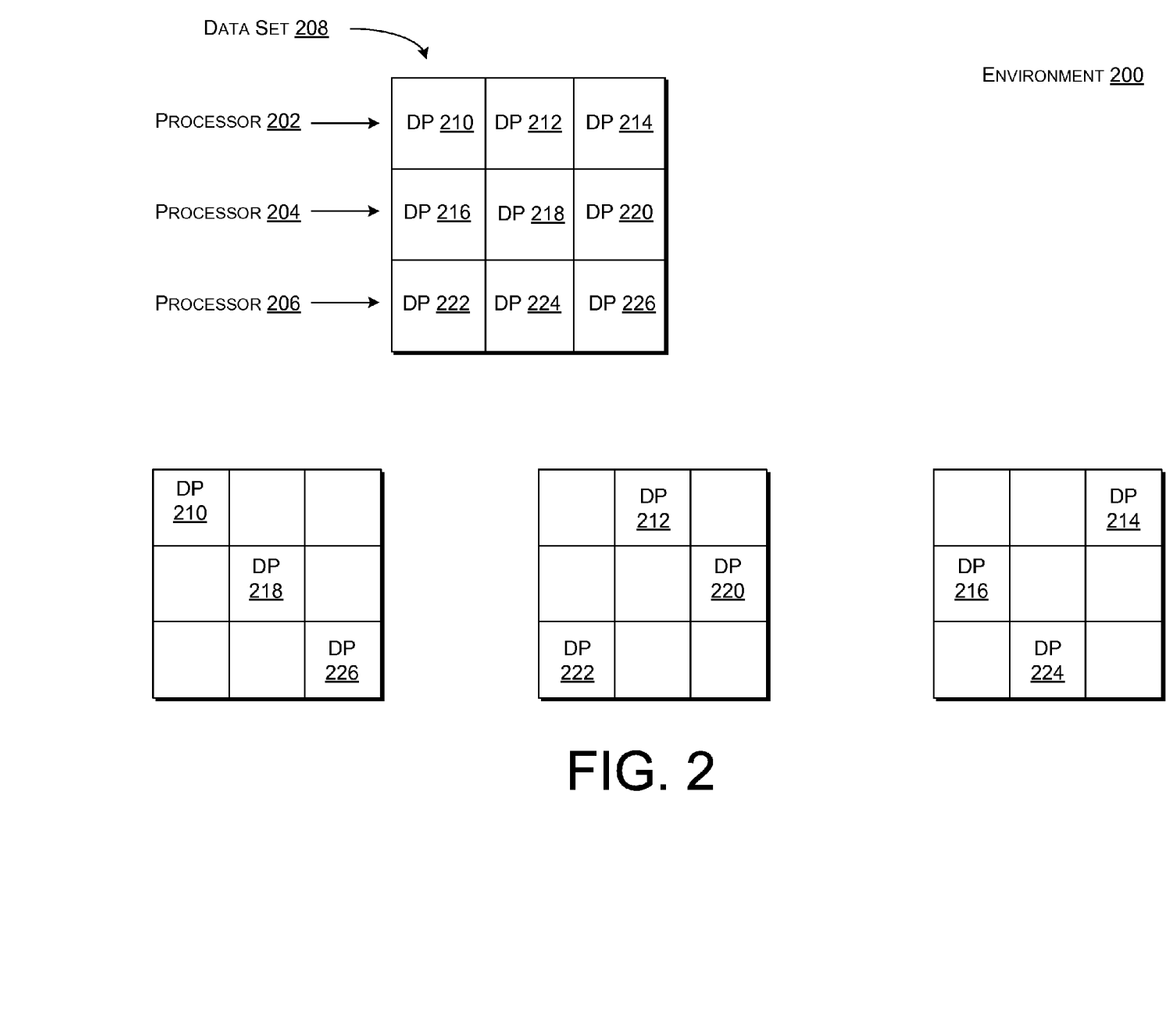
FIG. 2 illustrates a diagram showing partitioning and processing of a data set by a plurality of processors, in accordance with various embodiments.

FIG. 2 illustrates a diagram showing a data partition technique associated with a data set. As shown, environment 200 includes processor 202, processor 204, processor 206, and data set 208. Additionally, the data set 208 includes data partitions (DPs) 210-226. In this embodiment, the processors 202-206 may be any type of processor, such as, for example, a GPU.

Furthermore, and as described above in relation to FIG. 1, the data set 208 may be partitioned into a plurality of the DPs 210-226. As shown, the data set 208 has been partitioned into nine different DPs 210-226, however, it is contemplated that the data set 208 may be partitioned into any number of DPs 210-226. Since data included within the data set 208 may be dependent upon other data within the data set 208, partitioning the data set 208 into the DPs 210-226 may remove any or all dependencies between the data. As a result, the processors 202-206 may process their respective DPs 210-226 in parallel as opposed to processing the DPs 210-226 sequentially. In other words, the processors 202-206 may process their respective DPs 210-226 in a similar amount of time instead of needing to wait for another one of the processors 202-206 to complete processing of the DPs 210-226 that have been distributed to a respective processor. Processing the DPs 210-226 of the data set 208 in parallel may save a significant amount of time and/or computational cost.

In the above embodiment, the data set 208 is partitioned into the DPs 210-226. Moreover, the DPs 210-226 may be distributed to the processors 202-206. For instance, DPs 210, 212, and 214 may be distributed to processor 202, DPs 216, 218, and 220 may be distributed to processor 204, and DPs 222, 224, and 226 may be distributed to processor 206. Therefore, the processors 202-206 each will process different DPs 210-226 of the data set 208. In one embodiment, each processor 202-206 will only process the DPs 210-226 that are distributed to that particular processor 202-206. However, the processors 202-206 may process the DPs 210, 218, 226 in parallel and without waiting for the other processors 202-206 to complete their respective processing. Furthermore, after processing DPs 210, 218, 226, the processors 202-206 may process DPs 212, 220, 222 and without waiting for the other processors 202-206 to complete their respective processing. Finally, after processing DPs 212, 220, 222 the processors 202-206 may process DPs 214, 216, 224 to complete their respective processing.

That is, as shown in the top grid of FIG. 2, the processors 202-206 may first process DPs 210, 218, and 226. Subsequently, the processors 202-206 may then process DPs 212, 220, and 222 and may lastly process DPs 214, 216, and 224. Each processing step described above is shown in the lower portion of FIG. 2. In this embodiment, the processing of DPs 210-226 by the processors 202-206 is illustrated in three steps. First, the processors 202-206 may process DPs 210, 218, and 226 in parallel and without waiting for the other processors 202-206 to perform their respective processing. In particular, processor 202 may process DP 210, processor 204 may process DP 218, and processor 206 may process DP 226. Once DPs 210, 218, and 226 have been processed, the processors 202-206 may then process DPs 212, 220, and 222. To complete the processing of the DPs 210-226, the processors 202-206 may then process DPs 214, 216, and 224 in parallel.

Additionally, the partitioning techniques described above and shown in FIG. 2 may be performed by a partition algorithm. As shown, the partition algorithm may distribute the partitioned DPs 210-226 in a manner that produces a balanced workload across the processors 202-206. For instance, since the processors 202-206 each have been distributed three of the nine DPs 210-226, each processor 202-206 may have an approximately equal amount of data to process assuming each DP is similar in size. Creating such balanced workloads helps ensure that the processors 202-206 can process the data in a similar amount of time, which can save both time and computational resources. Moreover, in an example embodiment, the local counts 108A-108C and/or the global count 110, as described with respect to FIG. 1, may be used to partition the data set 208.

In various embodiments with respect to the partition algorithm, a co-occurrence matrix $R=(r_{jw})$ may be defined. For instance, for parallel CGS, $r_{jw}$ may refer to a number of occurrences of word w in document j. For parallel CVB, $r_{jw}=1$ if w occurs at least once in j and, otherwise, $r_{jw}=0$. Moreover, a submatrix may be defined in Equation 11 as:

$$R_{mn}=(r_{jw}) \forall j \in J_m, w \in V_n. \tag{11}$$

Moreover, the optimal data partition of data set 208 may be equivalent to minimizing the cost function shown in Equation 12:

$$C = \sum_{l=0}^{P-1} \max_{\substack{(m,n):\\ m \oplus l = n}} \{C_{mn}\}, \tag{12}$$

$$C_{mn} = \sum_{r_{jw} \in R_{mn}} r_{jw}.$$

The basic operation in the partition algorithms is either sampling topic assignments (in CGS) or updating variational parameters (in CVB). Each value of l in the first summation term in the preceding equation is associated with one epoch. All $R_{mn}$ satisfying $m \oplus l = n$ are the P submatrices of R, whose entries are used to perform basic operations in epoch l. Furthermore, the number of these two types of basic operations on each unique document/word pair (j,w) are all $r_{jw}$. Therefore, the total number of basic operations in $R_{m,n}$ is $C_{mn}$ for a single processor 202-206. Since all the processors 202-206 may have to wait for the processor 202-206 that is the slowest to complete its job before a synchronization step, the maximal $C_{mn}$ is the number of basic operations for the slowest of the processor 202-206. Thus the total number of basic operations is C. Moreover, a data partition efficiency ($\eta$)) for a given row and column partitions may be defined by Equation 13:

$$\eta = \frac{C_{opt}}{C}, \tag{13}$$

$$C_{opt} = \sum_{j \in J, w \in V} r_{jw}/P,$$

where $C_{opt}$ is the theoretically minimal number of basic operations. $\eta$ is defined to be less than or equal to 1. In this embodiment, a higher $\eta$ corresponds to more efficient partitions. Exact optimization may be achieved through solving an equivalent integer programming problem. Moreover, due to the large number of free variables for real-world data sets, a simple approximate algorithm is used to perform data partition.

In the above embodiment, the convention of initial value $j_0 = w_0 = 0$ is used. Further, the data partition algorithm divides row index J into disjoint subsets $J_m = \{j_{(m-1)}, \ldots, j_m\}$, where $j_m = \arg\min_j |mC_{opt} - \Sigma_{j \leq j} r_{jw}|$. Similarly, column index V is divided into disjoint subsets $V_n = \{w_{(n-1)}+1, \ldots, w_n\}$ by $w_n = \arg\min_w |mC_{opt} - \Sigma_{w \leq w} r_{jw}|$. This partition algorithm is relatively fast, since it needs only one full sweep over all word tokens or unique document/word pairs to calculate $j_m$ and $w_n$. This data partition algorithm may be run for several random permutations of J or V, and the partitions with the highest $\eta$ may be selected.

Furthermore, using the above data partition algorithm, a desirable $\eta$ on large data sets can be obtained. For a word token x in a corpus, the probability that x is the word w is $P(x=w)$ and the probability that x is in document j is $P(x \text{ in } j)$. If it is assumed that these two distributions are independent and x is i.i.d., then for a fixed P, the law of large numbers (Equation 14) asserts that:

$$P(x \text{ in } J_m) \approx \frac{j_m - j_{(m-1)}}{D} \approx \frac{1}{P} \text{ and} \tag{14}$$

$$P(x \in V_n) \approx \frac{w_n - w_{(n-1)}}{W} \approx \frac{1}{P}.$$

Independence (Equation 15) gives:

$$E[C_{mn}] \approx \frac{C_{opt}}{P} \text{ where } C_{mn} = \sum_x 1_{\{x \text{ in } J_m, x \in V_n\}}. \tag{15}$$

Furthermore, the law of large numbers and the central limit theorem also give $$C_{mn} \approx \frac{C_{opt}}{P}$$

and the distribution of $C_{mn}$ is approximately a normal distribution. Therefore, as shown above, the data partition algorithm may partition data set 208 in an efficient and computationally cost-effective manner.

Figure 3:
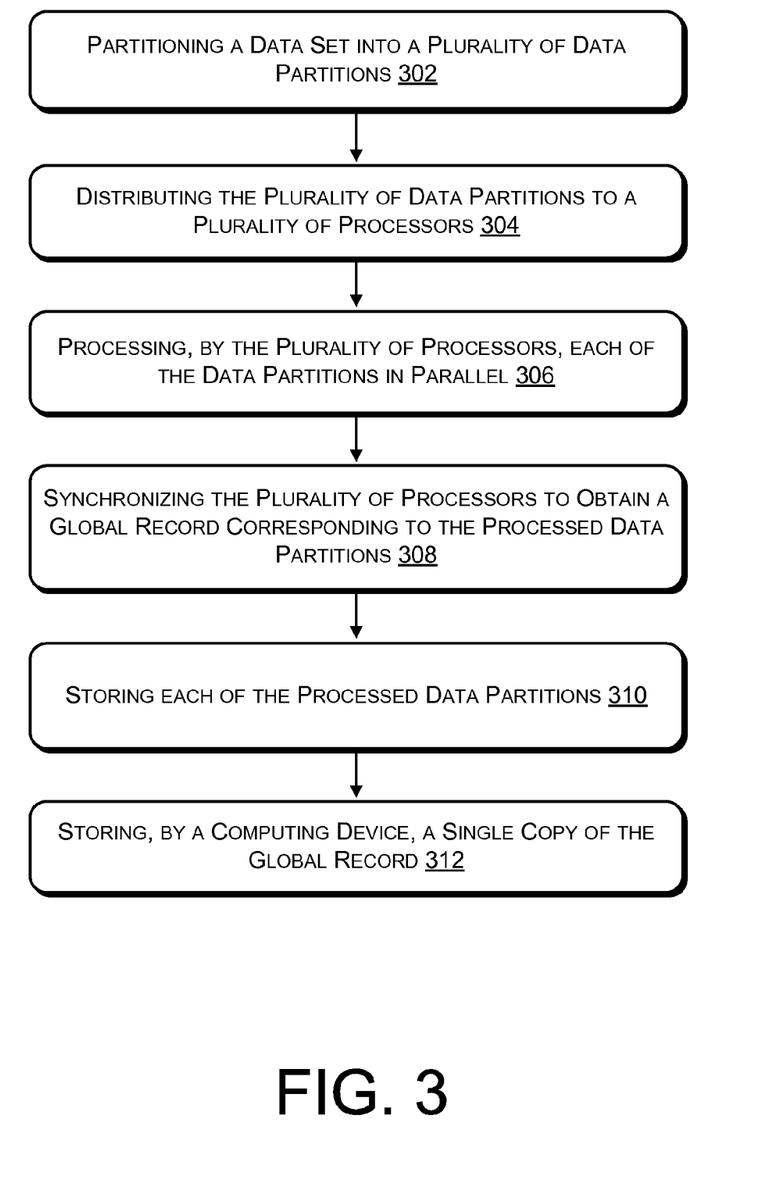
FIG. 3 illustrates a flowchart showing determining, by a plurality of processors, a global record associated with a data set, in accordance with various embodiments.
Figure 4:
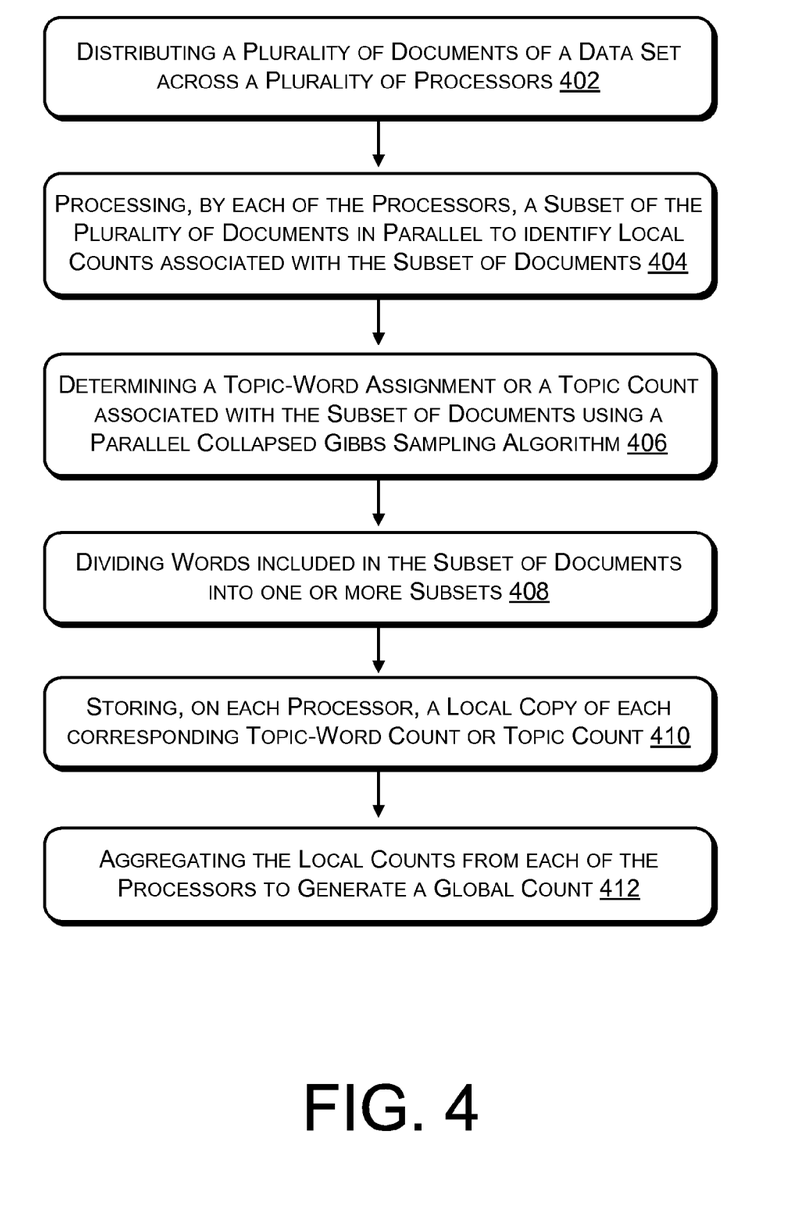
FIG. 4 illustrates a flowchart showing generating a global count from a plurality of documents based at least in part on a collapsed Gibbs sampling algorithm, in accordance with various embodiments.
Figure 5:
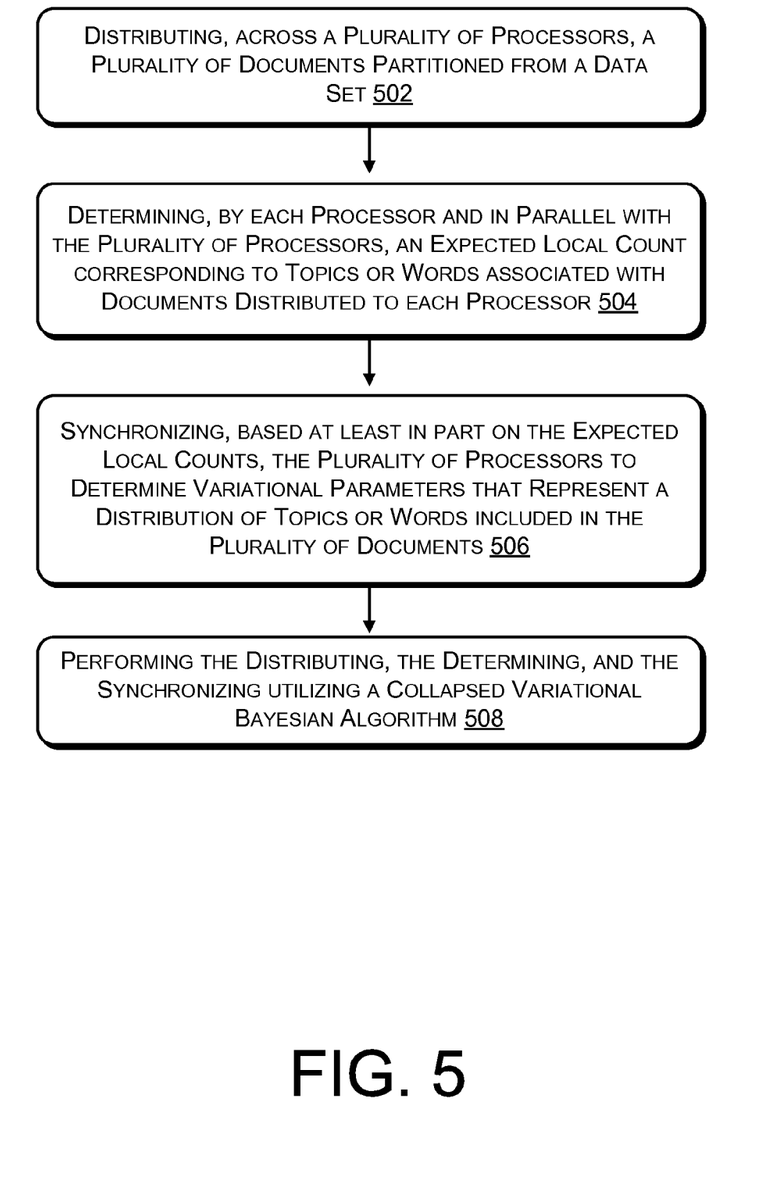
FIG. 5 illustrates a flowchart showing determining variational parameters from a plurality of documents based at least in part on a collapsed variational Bayesian algorithm, in accordance with various embodiments.

FIGS. 3-5 describe various example systems and/or processes for the partitioning and processing of data sets. The example processes are described in the context of the environment of FIGS. 1 and 2, but are not limited to those environments. The order in which the operations are described in each example process is not intended to be construed as a limitation, and any number of the described blocks can be combined in any order and/or in parallel to implement each process. Moreover, the blocks in the FIGS. 3-5 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 3 is a flowchart illustrating a method of partitioning and processing a data set to generate a global record. More particularly, block 302 illustrates partitioning a data set into a plurality of data partitions. In one embodiment, a data set may be the data set 102 or the data set 208 described with reference to FIGS. 1 and 2, respectively. Moreover, the plurality of data partitions may be the data partitions 104A-104C or the DPs 210-226 as shown in FIGS. 1 and 2, respectively. The data set may include any type of data, such as, for example, documents, text, images, etc. Moreover, data within the data set may be dependent upon other pieces of data. Therefore, partitioning the data set into a plurality of different data partitions may remove dependencies between the data. Such partitioning may be performed by the partition algorithm discussed above with respect to FIG. 2. Moreover, the partition algorithm may avoid memory access conflicts on the processors, such as GPUs, and efficiently balance workloads across the plurality of processors.

Block 304 illustrates distributing the plurality of data partitions to a plurality of processors. In various embodiments, the plurality of processors may correspond to the processors 106A-106C or the processors 202-206 described above with respect to FIGS. 1 and 2, respectively. Instead of one processor processing the entire data set, a plurality of different processors may process portions of the data set that have been previously partitioned. Therefore, since each processor would be processing less data, the data set may be processed faster and/or more efficiently. In a further embodiment, any one of the plurality of processors may be a GPU.

Block 306 illustrates processing, by the plurality of processors, each of the data partitions in parallel. As stated above, each processor may process the data partitions distributed to that processor. In other embodiments, each processor may only process the data partitions that are distributed to that processor. Furthermore, each of the processors may process the data partitions in parallel, meaning that the processors may process their respective data partitions simultaneously as opposed to sequentially. Since any dependencies between the data within the data set were removed as a result of the partitioning, each of the processors may process the data at the same time. By processing the data partitions in parallel, each processor would not need to wait to conduct its processing until another processor completed processing the data distributed to that processor.

In a further embodiment, the processors may process the data distributed to those processors to identify local counts corresponding to each data partition. For instance, the local counts may correspond to a number of different topics associated with a particular data partition and/or words included in that data partition that are associated with a particular topic. The local counts described above may be identified utilizing the CGS algorithm described above. Moreover, the processors may process the data distributed to the processors to identify expected local counts corresponding to each data partition. The expected local counts may correspond to an expected number of topics that are to be identified in each data partition and/or words associated with topics that are expected to be identified in the data partitions. In one embodiment, the expected local counts may be identified using the CVB algorithm discussed above in relation to FIG. 1. Since a local count or an expected local count is determined for each data partition of the data set, the local counts or the expected local counts accumulated for all the processors would reflect a local count or an expected local count for the entire data set.

Block 308 illustrates synchronizing the plurality of processors to obtain a global record corresponding to the processed data partitions. In one embodiment, the global record may correspond to global count 110. That is, utilizing the embodiment described above, once a local count or an expected local count has been determined by each of the processors, the local counts or expected local counts may be merged or aggregated to generate a global record. The global record may reflect the local counts or the expected local counts for the entire data set. If the CGS algorithm is utilized to perform the processing, the global record may correspond to a total number of topic counts or topic-word assignments for the entire data set. On the contrary, if the CVB algorithm is used to perform the processing, the global record may correspond to variational parameters that represent a distribution of topics for words included in the data set.

Block 310 illustrates storing each of the processed data partitions. The processed data partitions may be stored locally or in association with a respective processor. Further, block 312 illustrates storing, by a computing device, a single copy of the global record. In an example embodiment, a single copy of the global record may be saved on a shared memory platform accessible to each of the plurality of processors.

FIG. 4 is a flowchart illustrating processing a plurality of documents by a plurality of processors. In particular, block 402 illustrates distributing a plurality of documents of a data set across a plurality of processors. The data set may correspond to the data set 102 or the data set 208 described above with respect to FIGS. 1 and 2, respectively. In addition, the plurality of processors may correspond to the processors 106A-106C or the processors 202-206, as shown in FIGS. 1 and 2, respectively. Moreover, the data set may include a plurality of documents which may or may not be dependent upon one another. To remove any dependencies that exist between documents in the data set, the data set may be partitioned to create multiple subsets of documents. The partitioning may be performed using the data partition algorithm discussed in additional detail above. Each different subset of documents may then be distributed to one of a plurality of processors. As stated above, the processors may include any type of processor, such as a GPU.

Block 404 illustrates processing, by each of the processors, a subset of the plurality of documents in parallel to identify local counts associated with the subset of documents. In one embodiment, the local counts may correspond to local counts 108A-108C. Moreover, each processor may perform its respective processing simultaneously and in parallel. Therefore, since each of the processors may process its subset of documents during a same period of time, the amount of time to process the plurality of documents may be significantly reduced. Moreover, each processor may be limited to processing the subset of documents that are distributed to that processor as opposed to processing documents distributed to other processors. This way, the system may be able to ensure that each of the plurality of documents is processed.

Block 406 illustrates determining a topic-word assignment or a topic count associated with the subset of documents using a parallel collapsed Gibbs sampling algorithm. In various embodiments, the local count described above may include the topic-word assignment or the topic count. Furthermore, the topic count may refer to a number of different topics associated with each subset of documents and the topic-word assignment may correspond to words associated with topics described in each subset of documents. As stated previously, each processor may determine the topic count or the topic-word assignment based on processing the subset of documents distributed to that processor. Further, the parallel CGS algorithm discussed above may perform the processing by each processor.

Block 408 illustrates dividing words included in the subset of documents into one or more subsets. In one embodiment, this dividing step may be performed by the previously described data partition algorithm. Moreover, block 410 illustrates storing, on each processor (or in association with each processor), a local copy of each corresponding topic-word assignment or topic count.

Block 412 illustrates aggregating the local counts from each of the processors to generate a global count. The global count may correspond to global count 110. The global count may be determined by combining the local counts generated by each of the processors. Therefore, the global count may correspond to a total number of local counts for the plurality of documents included in the data set. Furthermore, provided that the local counts correspond to topic counts or topic-word assignments associated with the plurality of documents, the global count would then represent a total number of topic-word assignments or topic counts associated with the plurality of documents. In a further embodiment, since the global count may be based on the local counts determined by the plurality of processors, the global count may not be determined until each of the processors has finished determining its respective local count.

FIG. 5 is a flowchart illustrating partitioning and processing a plurality of documents. More particularly, block 502 illustrates distributing, across a plurality of processors, a plurality of documents partitioned from a data set. As stated previously with respect to FIG. 4, the data set may include multiple documents that can be partitioned into small subsets of documents. Partitioning the documents may remove any dependencies between documents in the data set. In one embodiment, the partitioning may be performed by the data partition algorithm discussed above. Moreover, the partitioned documents may be distributed across a plurality of processors, such as processors 104A-104C, processors 202-206, or one or more GPUs. For instance, the partitioned documents may be distributed across the plurality of processors so that the workloads for the plurality of processors are efficiently balanced. That is, the partitioned documents may be distributed in a manner in which each processor is distributed a comparable number of documents.

Block 504 illustrates determining, by each processor and in parallel with the plurality of processors, an expected local count corresponding to topics or words associated with documents distributed to each processor. That is, each processor may determine an expected local count at the same time without needing to wait for processing performed by other processors. Moreover, the expected local count may correspond to an expected number of topics to be identified in each of the plurality of documents and/or words associated with topics that are expected to be identified in the plurality of documents. The expected local counts may be stored locally on each processor that determined that particular expected local count.

Block 506 illustrates synchronizing, based at least in part on the expected local counts, the plurality of processors to determine variational parameters that represent a distribution of topics for words included in the plurality of documents. That is, the variational parameters may be determined based on the expected local counts determined by each of the plurality of processors. Moreover, in some embodiments, because the variational parameters depend in part on the expected local counts, the variational parameters may not be determined until each processor has identified its respective expected local count. Therefore, determining the variational parameters may be limited by the processor that takes the most amount of time to determine an expected local count. Additionally, only a single copy of the variational parameters may need to be stored on a shared memory platform accessible by the plurality of processors.

Block 508 illustrates performing the distributing, the determining, and the synchronizing utilizing a collapsed variational Bayesian algorithm. In one embodiment, the CVB algorithm described above may be utilized. Moreover, the CVB algorithm may be executed on one or more GPUs to perform the foregoing functions.

Figure 6:
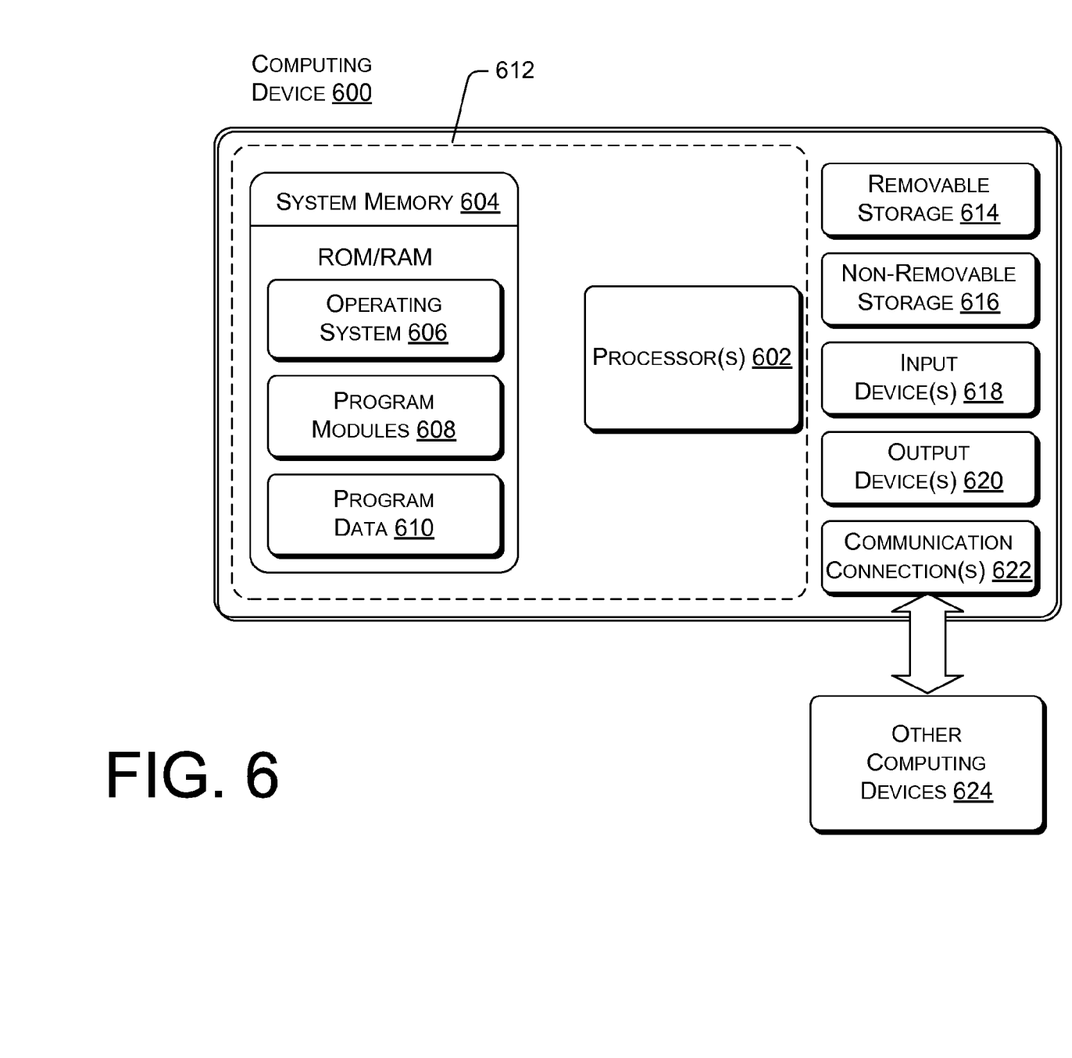
FIG. 6 is a block diagram that illustrates a representative computing device that may implement the parallel learning method techniques described herein, in accordance with various embodiments.

FIG. 6 illustrates a representative computing device 600 that may implement the data partitioning and processing described herein, in accordance with various embodiments. The techniques and mechanisms described herein may be implemented by multiple instances of computing device 600 as well as by any other computing device, system, and/or environment. The computing device 600 shown in FIG. 6 is only one example of a computing device and is not intended to suggest any limitation as to the scope of use or functionality of any computing device utilized to perform the processes and/or procedures described above.

In at least one configuration, the computing device 600 includes at least one processor 602 and system memory 604. The processor(s) 602 may execute one or more modules and/or processes to cause the computing device 600 to perform a variety of functions. In some embodiments, the processor(s) 602 are a CPU, a GPU, both CPU and GPU, or other processing units or components known in the art. Moreover, the processor(s) 602 may include the processors 106A-106C and the processors 202-206 shown in FIGS. 1 and 2, respectively. Additionally, each of the processor(s) 602 may possess its own local memory, which also may store program modules, program data, and/or one or more operating systems.

Depending on the exact configuration and type of the computing device 600, the system memory 604 may be volatile (such as RAM), non-volatile (such as ROM, flash memory, miniature hard drive, memory card, or the like) or some combination thereof. The system memory 604 may include an operating system 606, one or more program modules 608, and may include program data 610. The computing device 600 is of a very basic configuration demarcated by a dashed line 612. Again, a terminal may have fewer components but may interact with a computing device that may have such a basic configuration.

The computing device 600 may have additional features and/or functionality. For example, the computing device 600 may also include additional data storage devices (removable and/or non-removable) such as, for example, magnetic disks, optical disks, or tape. Such additional storage is illustrated in FIG. 6 by removable storage 614 and non-removable storage 616. Computer-readable media may include volatile and non-volatile, removable, and non-removable media implemented in any method or technology for storage of information, such as computer readable instructions, data structures, program modules, or other data. The system memory 604, the removable storage 614 and the non-removable storage 616 are all examples of computer-readable media and/or computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing device 600. Any such computer storage media may be part of the computing device 600. Moreover, the computer-readable media may include computer-executable instructions that, when executed by the processor(s) 602, perform various functions and/or operations described herein.

The computing device 600 may also have input device(s) 618 such as a keyboard, a mouse, a pen, a voice input device, a touch input device, etc. Output device(s) 620, such as a display, speakers, a printer, etc. may also be included.

The computing device 600 may also contain communication connections 622 that allow the device to communicate with other computing devices 624, such as over a network. These networks may include wired networks as well as wireless networks. The communication connections 622 are some examples of communication media. Communication media may typically be embodied by computer readable instructions, data structures, program modules, etc.

It is appreciated that the illustrated computing device 600 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
   partitioning a data set into a plurality of data partitions, the partitioning including removing dependencies in the data set that require some of the data partitions to be processed sequentially rather than in parallel;
   distributing the plurality of data partitions to a plurality of processors, each of the plurality of data partitions being assigned to a single one of the plurality of processors;
   processing, by the plurality of processors, each of the plurality of data partitions in parallel; and
   synchronizing the plurality of processors to obtain a global record corresponding to the processed data partitions.

2. The method as recited in claim 1, further comprising generating, by the plurality of processors, one or more local counts corresponding to each of the data partitions.

3. The method as recited in claim 1, wherein the processing the data partitions in parallel is implemented by one or more algorithms.

4. The method as recited in claim 3, wherein the plurality of data partitions are utilized to train the one or more algorithms.

5. The method as recited in claim 1, wherein:
   the partitioning is performed by a partition algorithm;
   the processing is performed at least in part by one or more graphics processing unit (GPU); and
   the distributing is performed by a partition algorithm that balances workloads across the plurality of processors.

6. The method as recited in claim 1, further comprising:
   storing each of the processed data partitions in association with a respective one of the plurality of processors; and
   storing, by a computing device, a single copy of the global record that is shared between each of the plurality of processors.

7. A method comprising:
   distributing subsets of a plurality of documents of a data set across a plurality of processors, the plurality of documents being partitioned into the subsets to remove dependencies between the plurality of documents, the dependencies between the plurality of documents causing the plurality of documents to be processed sequentially rather than in parallel;
   processing, by a particular one of the plurality of processors, a particular subset of the plurality of documents in parallel with the plurality of processors to identify local counts associated with the subset of documents; and
   aggregating the local counts from each of the processors to generate a global count that is representative of the data set.

8. The method as recited in claim 7, wherein the operations further comprise:
   processing the subset of documents to identify a topic-word assignment or a topic count associated with the subset of documents; and
   determining the topic-word assignment or the topic count using a parallel collapsed Gibbs sampling algorithm.

9. The method as recited in claim 8, wherein the topic-word assignment corresponds to words associated with topics associated with the subset of documents and the topic count corresponds to a number of different topics associated with each document.

10. The method as recited in claim 8, wherein the operations further comprise:
    dividing words included in the subset of documents into one or more subsets; and
    storing, on memory associated with a respective processor, a local copy of each corresponding topic-word assignment or topic count.

11. The method as recited in claim 7, wherein the operations further comprise identifying the local counts and the global count utilizing a collapsed Gibbs sampling algorithm executed on one or more graphics processing unit.

12. The method as recited in claim 7, further comprising partitioning the data set into the plurality of documents in order to remove the dependencies between the plurality of documents.

13. The method as recited in claim 7, wherein the global count represents a total number of topic-word assignments or topic counts associated with the plurality of documents distributed to the plurality of processors.

14. The method as recited in claim 7, wherein each processor is limited to processing a subset of documents distributed to that processor.

15. The method as recited in claim 7, wherein the global count is determined after calculation of the local counts.

16. A system comprising:
    a plurality of processors; and
    memory to store computer-executable instructions that, when executed by one of the plurality of processors, perform operations comprising:
    distributing, across the plurality of processors, subsets of documents partitioned from a plurality of documents included in a data set;

determining, by each processor and in parallel with the plurality of processors, an expected local count corresponding to topics or words expected to be identified in the documents distributed to each processor; and synchronizing, based at least in part on the expected local counts, the plurality of processors to determine variational parameters that represent a distribution of the topics or the words expected to be identified in the plurality of documents.

17. The system as recited in claim 16, wherein the distributing, the determining, and the synchronizing are performed by a collapsed variational Bayesian algorithm.

18. The system as recited in claim 16, wherein:
at least one of the plurality of processors is a graphics processing unit (GPU); and
the collapsed variational Bayesian algorithm is executed by the GPU.

19. The system as recited in claim 18, wherein the collapsed variational Bayesian algorithm causes a single copy of the variational parameters to be stored in the memory and shared by each of the plurality of processors.

20. The system as recited in claim 16, wherein the expected local count determined by each processor is stored locally on memory associated with a respective processor.

* * * * *